United States Patent
Jungbauer et al.

(10) Patent No.: US 8,894,466 B2
(45) Date of Patent: Nov. 25, 2014

(54) METHOD OF ELECTROSTATIC DEPOSITION OF PARTICLES, ABRASIVE GRAIN AND ARTICLES

(75) Inventors: Katrin Jungbauer, Loiching (DE); Jimmie R. Baran, Jr., Prescott, WI (US); Roxanne A. Boehmer, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 244 days.

(21) Appl. No.: 13/513,207

(22) PCT Filed: Nov. 17, 2010

(86) PCT No.: PCT/US2010/056973
§ 371 (c)(1),
(2), (4) Date: Jun. 20, 2012

(87) PCT Pub. No.: WO2011/068678
PCT Pub. Date: Jun. 9, 2011

(65) Prior Publication Data
US 2012/0252321 A1    Oct. 4, 2012

Related U.S. Application Data

(60) Provisional application No. 61/266,286, filed on Dec. 3, 2009.

(51) Int. Cl.
*B24D 3/34* (2006.01)
*C09K 3/14* (2006.01)

(52) U.S. Cl.
CPC .................. *C09K 3/1436* (2013.01)
USPC ............... 451/28; 451/526; 451/539; 51/295; 51/309

(58) Field of Classification Search
CPC ..................................... B24D 3/34; C09K 3/14
USPC ........................ 451/526–547; 51/295, 309
See application file for complete search history.

(56) References Cited

U.S. PATENT DOCUMENTS

| | | |
|---|---|---|
| 2,287,837 A | 6/1942 | Smyser |
| 2,447,347 A | 8/1948 | Smyser |
| 2,591,988 A | 4/1952 | Willcox |
| 3,333,776 A | 8/1967 | Rauner |
| 3,697,442 A * | 10/1972 | Lieberman .................... 516/116 |

(Continued)

FOREIGN PATENT DOCUMENTS

| | | |
|---|---|---|
| CN | 1785880 | 6/2006 |
| EP | 1245644 | 10/2002 |

(Continued)

OTHER PUBLICATIONS

PCT/US2010/056973 International Search Report, Mar. 3, 2011, 4 pages.

(Continued)

*Primary Examiner* — George Nguyen
(74) *Attorney, Agent, or Firm* — Carolyn A. Fischer

(57) ABSTRACT

Presently described are methods of making an article via electrostatic deposition of particles, abrasive grains and articles, as well as a method of repairing a painted surface. The abrasive grain comprises a plurality of abrasive particles having a median primary particle size of less than 75 microns, and discrete hydrophobic nanoparticles.

22 Claims, 1 Drawing Sheet

50μm

(56) References Cited

U.S. PATENT DOCUMENTS

| | | | |
|---|---|---|---|
| 3,867,795 | A | 2/1975 | Howard |
| 4,314,827 | A | 2/1982 | Leitheiser |
| 4,518,397 | A | 5/1985 | Leitheiser |
| 4,623,364 | A | 11/1986 | Cottringer |
| 4,734,104 | A | 3/1988 | Broberg |
| 4,737,163 | A | 4/1988 | Larkey |
| 4,744,802 | A | 5/1988 | Schwabel |
| 4,770,671 | A | 9/1988 | Monroe |
| 4,881,951 | A | 11/1989 | Wood et al. |
| 4,997,461 | A | 3/1991 | Markhoff-Matheny |
| 5,009,675 | A | 4/1991 | Kunz |
| 5,011,508 | A | 4/1991 | Wald |
| 5,026,404 | A | 6/1991 | Kunz |
| 5,042,991 | A | 8/1991 | Kunz |
| 5,090,968 | A | 2/1992 | Pellow |
| 5,139,978 | A | 8/1992 | Wood |
| 5,168,082 | A | 12/1992 | Matchett |
| 5,201,916 | A | 4/1993 | Berg |
| 5,213,591 | A | 5/1993 | Celikkaya |
| 5,227,104 | A | 7/1993 | Bauer |
| 5,254,192 | A * | 10/1993 | Speakman ............ 156/94 |
| 5,352,254 | A | 10/1994 | Celikkaya |
| 5,366,523 | A | 11/1994 | Rowenhorst |
| 5,429,647 | A | 7/1995 | Larmie |
| 5,498,269 | A | 3/1996 | Larmie |
| 5,551,962 | A * | 9/1996 | Ho ........................ 51/306 |
| 5,551,963 | A | 9/1996 | Larmie |
| 5,556,437 | A | 9/1996 | Lee |
| 5,624,471 | A * | 4/1997 | Gaeta et al. ............ 51/295 |
| 5,849,052 | A | 12/1998 | Barber |
| 6,037,019 | A | 3/2000 | Kooyer |
| 6,500,493 | B2 * | 12/2002 | Swei et al. ............ 427/458 |
| 6,758,734 | B2 | 7/2004 | Braunschweig |
| 7,001,580 | B2 | 2/2006 | Baran, Jr. |
| 7,381,466 | B2 | 6/2008 | Zeiringer |
| 8,008,201 | B2 * | 8/2011 | Kroll et al. ............ 438/690 |
| 8,361,176 | B2 * | 1/2013 | Seth et al. ............ 51/293 |
| 2001/0049911 | A1 | 12/2001 | Swei |
| 2005/0113489 | A1 * | 5/2005 | Baran et al. ............ 523/300 |
| 2005/0124749 | A1 | 6/2005 | Schachtely |
| 2006/0159635 | A1 * | 7/2006 | Meyer et al. ............ 424/59 |
| 2007/0077209 | A1 * | 4/2007 | Baran et al. ............ 424/45 |
| 2008/0081539 | A1 * | 4/2008 | Ernsberger ............ 451/28 |
| 2008/0166558 | A1 | 7/2008 | Baran, Jr. |
| 2008/0172951 | A1 | 7/2008 | Starling |
| 2008/0286362 | A1 | 11/2008 | Baran, Jr. |
| 2009/0081304 | A1 | 3/2009 | Choy |
| 2010/0044478 | A1 | 2/2010 | Yen |
| 2010/0314575 | A1 * | 12/2010 | Gao et al. ............ 252/70 |
| 2011/0110992 | A1 * | 5/2011 | Garrison et al. ............ 424/401 |
| 2011/0306079 | A1 * | 12/2011 | Tulsky et al. ............ 435/29 |
| 2012/0233929 | A1 * | 9/2012 | Baran et al. ............ 51/308 |
| 2012/0302372 | A1 * | 11/2012 | Ricci et al. ............ 473/372 |

FOREIGN PATENT DOCUMENTS

| | | |
|---|---|---|
| JP | 02-34685 | 2/1990 |
| JP | 11-268911 | 10/1999 |
| JP | 2005-319556 | 11/2005 |
| WO | 95/24992 | 9/1995 |
| WO | 01/27215 | 4/2001 |
| WO | 2004/106002 | 12/2004 |
| WO | WO 2007/019229 | 2/2007 |
| WO | WO 2008/079650 | 7/2008 |
| WO | WO 2009/085926 | 7/2009 |
| WO | 2009-117512 | 9/2009 |
| WO | WO 2009/118381 | 10/2009 |
| WO | WO 2010/074862 | 7/2010 |
| WO | WO 2010/151435 | 12/2010 |
| WO | WO 2011/068742 | 6/2011 |

OTHER PUBLICATIONS

Brunauer et al., "Adsorption of Gases in Multimolecular Layers", J. Am. Chem. Soc. Feb. 1938, vol. 60, p. 309-319.

Abdelwahed et al., "Freeze-drying of nanocapsules: Impact of annealing on the drying process", International Journal of Pharmaceutics, vol. 324, No. 1, Oct. 31, 2006, pp. 74-82.

* cited by examiner

50μm

50μm

50μm

METHOD OF ELECTROSTATIC DEPOSITION OF PARTICLES, ABRASIVE GRAIN AND ARTICLES

CROSS REFERENCE TO RELATED APPLICATIONS

This application is a national stage filing under 35 U.S.C. 371 of PCT/US2010/056973, filed Nov. 17, 2010, which claims priority to U.S. Provisional Application Ser. No. 61/266,286, filed Dec. 3, 2009, the disclosure of which is incorporated by reference in their entirety herein.

BACKGROUND

Various abrasive grains are known such as described in U.S. Pat. Nos. 5,026,404 and 5,042,991. Further, methods of electrostatic deposition of abrasive powder are also known, such as described in US 2001/0049911.

SUMMARY

Although various (e.g. abrasive grain) powders are known, industry would find advantage in improved methods of electrostatic deposition of fine (e.g. abrasive grain) powders as well as improved fine abrasive grains and articles.

In one embodiment, a method of making an article is described comprising providing a substrate; electrostatically depositing particles such that the particles are bonded to the substrate. The particles comprise a plurality of larger (e.g. abrasive) particles having a median primary particle size of less than 75 microns and discrete hydrophobic nanoparticles.

In another embodiment, an abrasive grain is described comprising a plurality of larger abrasive particles having a median primary particle size of less than 75 microns and discrete hydrophobic nanoparticles.

In yet another embodiment, an abrasive article is described comprising a substrate and a plurality of the abrasive particles described herein.

Also described is a method of repairing a painted surface. The method comprises providing a painted surface having a surface defect and removing the surface defect by abrading with the abrasive article described herein.

DETAILED DESCRIPTION OF THE PREFERRED EMBODIMENTS

Figure 1:
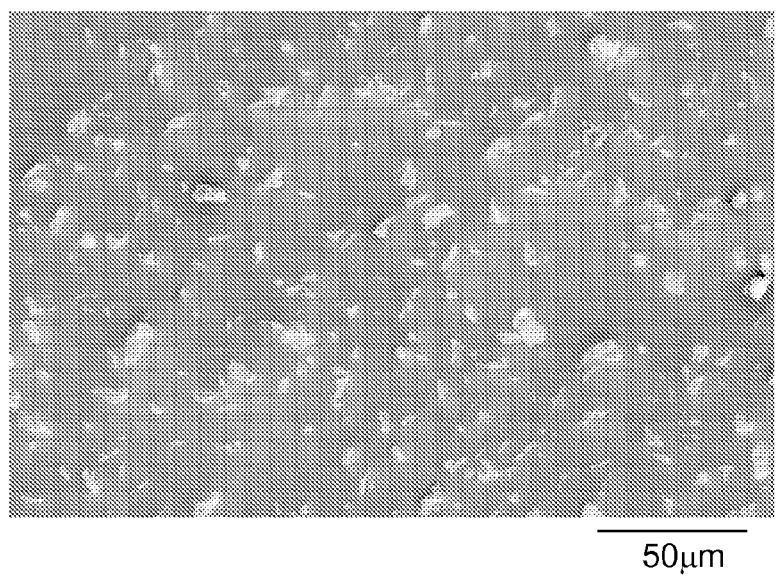
FIG. 1 depicts an illustrative scanning electron photomicrograph of the surface of an abrasive article comprising aluminum oxide abrasive grain particles and hydrophobic nanoparticles.

Presently described are methods of making an article via electrostatic deposition of particles, abrasive grains and articles, as well as a method of repairing a painted surface.

The abrasive grain described herein comprises fine abrasive particles and discrete hydrophobic nanoparticles. Without intending to be bound by theory, it is surmised that the inclusion of the discrete hydrophobic nanoparticles inhibits water adsorption of the fine abrasive particles as described in Provisional U.S. Patent Application Ser. No. 61/266,278, filed Dec. 3, 2009, entitled "METHOD OF INHIBITING WATER ADSORPTION OF POWDER BY ADDITION OF HYDROPHOBIC NANOPARTILCES". In some embodiments, it was not possible to charge the abrasive particles when the nanoparticles were excluded. In other embodiments, the inclusion of the nanoparticles widened the processing parameters such that the temperature and humidity need not be precisely controlled. In yet other embodiments, the inclusion of the nanoparticles provided abrasive articles that exhibited improved uniformity.

The method will be described herein with reference to abrasive grains, as illustrative particles for electrostatic deposition. However, the attributes provided by the inclusion of the discrete hydrophobic nanoparticles, as described herein, are believed applicable to electrostatic deposition of other types of fine hydrophilic particles (i.e. particles that adsorb water), such as inorganic oxide particles and the like, such as commonly found in powder (e.g. paint) coatings.

The (e.g. abrasive grain) particles may be distinguished from the nanoparticles by relative size. The particles are larger than the nanoparticles. Further, the particles and nanoparticles typically comprise different materials.

Typically, the nanoparticles have an average primary or agglomerate particle size diameter of less than 100 nanometers. "Agglomerate" refers to a weak association between primary particles which may be held together by charge or polarity and can be broken down into smaller entities. "Primary particle size" refers to the mean diameter of a single (non-aggregated, non-agglomerated) particle. In some embodiments, the nanoparticles have an average particle size of no greater than 75 nanometers or 50 nanometers. The nanoparticles typically have an average primary or agglomerate particle size diameter of at least 3 nanometers. In some preferred embodiments, the average primary or agglomerate particle size is less than 20 nm, 15 nm, or 10 nm. Nanoparticle measurements can be based on transmission electron miscroscopy (TEM).

Unlike fumed silica that comprises silica aggregates, the nanoparticles utilized herein comprise a sufficient concentration of discrete unaggregated nanoparticles. As used herein "aggregate" refers to strongly bonded or fused particles where the resulting external surface area may be significantly smaller than the sum of calculated surface areas of the individual components. The forces holding an aggregate together are strong forces, for example covalent bonds, or those resulting from sintering or complex physical entanglement. Although agglomerated nanoparticles can be broken down into smaller entities such as discrete primary particles such as by application of a surface treatment, the application of a surface treatment to an aggregate simply results in a surface treated aggregate. In some embodiments, a majority of the nanoparticles (i.e. at least 50%) are present as discrete unagglomerated nanoparticles. For example, at least 70%, 80% or 90% of the nanoparticles are present as discrete unagglomerated nanoparticles.

The (e.g. abrasive) particles have a median primary or agglomerate particle size (generally measured as an effective diameter) of at least 100 nm (i.e., 0.1 microns), 200 nm, 300 nm, 400 nm, or 500 nm. Without intending to be bound by theory, the effect of inhibiting water adsorption as contributed by the inclusion of the discrete hydrophobic nanoparticles, tends to increase with decreasing median (e.g. abrasive) particle size. Hence, in favored embodiments, the median particle size is no greater than 75 microns, 50 microns, or 25 microns. In some embodiments, the particles have a median particle size of no greater than 20 microns, 15 microns, or 10 microns.

The larger (e.g. abrasive grain) particles typically have a median primary particle size of at least 50, 60, 70, 80, 90, or 100 times larger than the mean particle size of the nanoparticles. In some embodiments, the larger (e.g. abrasive grain) particles have a median primary particle size of at least 200, 300, 400, 500, 600, 700, 800 times larger than the mean particle size of the nanoparticles. The larger (e.g. abrasive grain) particles may have a median primary particle size up to 5,000 or 10,000 times larger than the mean particle size of the nanoparticles.

In a favored embodiment, the particles are abrasive particles, also commonly referred to as an "abrasive grain". Abrasive grain refers to materials in the form of particles having a Mohs hardness of at least 8 (preferably, at least 9).

Exemplary useful abrasive particles include fused aluminum oxide based materials such as aluminum oxide, ceramic aluminum oxide (which may include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet, flint, emery, sol-gel derived abrasive particles, and blends thereof. Desirably, the abrasive particles comprise fused aluminum oxide, heat-treated aluminum oxide, ceramic aluminum oxide, silicon carbide, alumina zirconia, garnet, diamond, cubic boron nitride, sol-gel derived abrasive particles, or mixtures thereof. Examples of sol-gel abrasive particles include those described U.S. Pat. No. 4,314,827 (Leitheiser et al.); U.S. Pat. No. 4,518,397 (Leitheiser et al.); U.S. Pat. No. 4,623,364 (Cottringer et al.); U.S. Pat. No. 4,744,802 (Schwabel); U.S. Pat. No. 4,770,671 (Monroe et al.); U.S. Pat. No. 4,881,951 (Wood et al.); U.S. Pat. No. 5,011,508 (Wald et al.); U.S. Pat. No. 5,090,968 (Pellow); U.S. Pat. No. 5,139,978 (Wood); U.S. Pat. No. 5,201,916 (Berg et al.); U.S. Pat. No. 5,227,104 (Bauer); U.S. Pat. No. 5,366,523 (Rowenhorst et al.); U.S. Pat. No. 5,429,647 (Laramie); U.S. Pat. No. 5,498,269 (Larmie); and U.S. Pat. No. 5,551,963 (Larmie), the disclosures of which are incorporated herein by reference.

Sintered alpha alumina-based ceramic particles can be made by preparing and sintering base particles, such as described in U.S. Pat. No. 5,352,254; incorporated herein by reference.

A variety of inorganic or organic nanoparticles can be used to practice the electrostatic deposition methods described herein.

Exemplary inorganic nanoparticle materials include for example metal phosphates, sulfonates and carbonates (e.g., calcium carbonate, calcium phosphate, hydroxy-apatite); metal oxides (e.g., zirconia, titania, silica, ceria, alumina, iron oxide, vanadia, zinc oxide, antimony oxide, tin oxide, and alumina-silica), and metals (e.g., gold, silver, or other precious metals).

The nanoparticles are typically substantially spherical in shape. However, other shapes such as elongated shapes may alternatively be employed. For elongated shapes, an aspect ratios less than or equal to 10 is typical, with aspect ratios less than or equal to 3 more typical.

In some embodiments, the nanoparticles may comprise an organic material. Specific examples of useful organic materials include (e.g. alkylated) buckminsterfullerenes (fullerenes) and (e.g. alkylated) polyamidoamine (PAMAM) dendrimers. Specific examples of fullerenes include $C_{60}$, $C_{70}$, $C_{82}$, and $C_{84}$. Specific examples of PAMAM dendrimers include those of Generations 2 through 10 (G2 G10), available from Aldrich Chemical Company, Milwaukee, Wis. PAMAM dendrimers are currently commercially available with $C_{12}$ surface functional groups. The alkyl groups on the organic molecules may be straight or branched and may range from at least $C_3$ to not greater than $C_{30}$ and may be any size or range in between $C_3$ and $C_{30}$. For example, the ranges may be $C_3$ to $C_{22}$; $C_3$ to $C_{18}$; $C_3$ to $C_{12}$; or $C_3$ to $C_8$, and any combination or integer therebetween. The surface-modified organic molecules may be present in a continuous phase of an emulsion at a level of from at least 0.1 percent by weight, such as described in U.S. Pat. No. 7,001,580.

Specific examples of organic polymeric microspheres include microspheres that comprise polystyrene, available from Bangs Laboratories, Inc., Fishers, Ind., as powders or dispersions. Average particle sizes of the polystyrene microspheres range from at least 20 nm to not more than 60 nm. Current commercially available average particle sizes are 20, 30, 50, and 60 nm.

When the nanoparticle is comprised of an organic material, the nanoparticle may be sufficiently hydrophobic in the absence of a surface treatment in view of the hydrophobic nature of the organic material.

In some embodiments, the nanoparticles preferably comprise an inorganic material such as a metal oxide material. In some embodiments, the nanoparticles preferably comprise a silica, zirconia, or mixtures thereof.

Various nanoparticles are commercially available. Commercial sources of silica nanoparticles are available from Nalco Co, Napervillle, Ill. Nanoparticles can also be made using techniques known in the art. For example, zirconia nanoparticles can be prepared using hydrothermal technology, as described for example in PCT application US2008/087385.

In some embodiments, the (e.g. non-surface modified) nanoparticles may be in the form of a colloidal dispersion. For example, colloidal silica dispersions are available from Nalco Co. under the trade designations "NALCO 1040," "NALCO 1050," "NALCO 1060," "NALCO 2327," and "NALCO 2329". Zirconia nanoparticle dispersions are available from Nalco Chemical Co. under the trade designation "NALCO OOSSOO8" and from Buhler AG Uzwil, Switzerland under the trade designation "Buhler zirconia Z-WO".

The nanoparticles may be fully condensed. Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

The inorganic (e.g. metal oxide) nanoparticles are generally hydrophilic in nature. The nanoparticles are rendered hydrophobic upon being surface modified with a hydrophobic surface treatment.

Surface modification involves attaching surface modification agents to inorganic oxide particles to modify the surface characteristics. In general, a surface treatment has a first end that will attach to the nanoparticle surface (covalently, ionically or through strong physisorption) and a second end that imparts steric stabilization that prevents the particles from agglomerating such as permanently fusing together. The inclusion of surface modification can also improve the compatibility of the particles with other materials. For example, an organic end group such as the organic group of an organosilane can improve the compatibility of the particles with organic matrix material such as polymerizable and thermoplastic resins such as the binder of an abrasive article or powder coating.

Examples of surface treatment agents include alcohols, amines, carboxylic acids, sulfonic acids, phosphonic acids, silanes and titanates. The surface treatment may optionally comprise fluorine substituents. The preferred type of treatment agent is determined, in part, by the chemical nature of the (e.g. metal oxide) nanoparticle surface. Silanes are preferred for silica and for other siliceous fillers. Silanes and carboxylic acids are preferred for metal oxides such as zirconia. When an organosilane surface treatment is applied to metal oxide nanoparticles, the silane end is generally adsorbed by the nanoparticle. When a carboxylic acid is applied to a zirconia nanoparticle, the acid end is generally adsorbed by the zirconia.

Exemplary silanes include, but are not limited to, alkyltrialkoxysilanes such as n-octyltrimethoxysilane, n-octyltriethoxysilane, isooctyltrimethoxysilane, dodecyltrimethoxysilane, octadecyltrimethoxysilane, propyltrimethoxysilane, and hexyltrimethoxysilane; methacryloxyalkyltrialkoxysilanes or acryloxyalkyltrialkoxysilanes such as 3-methacryloxypropyltrimethoxysilane, 3-acryloxypropyltrimethoxysilane, and 3-(methacryloxy)propyltriethoxysilane; methacryloxyalkylalkyldialkoxysilanes or acryloxyalkylalkyldialkoxysilanes such as 3-(methacryloxy)propylmethyldimethoxysilane, and 3-(acryloxypropyl)methyldimethoxysilane; methacryloxyalkyldialkylalkoxysilanes or acyrloxyalkyldialkylalkoxysilanes such as 3-(methacryloxy)propyldimethylethoxysilane; mercaptoalkyltrialkoxylsilanes such as 3-mercaptopropyltrimethoxysilane; aryltrialkoxysilanes such as styrylethyltrimethoxysilane, phenyltrimethoxysilane, phenyltriethoxysilane, and p-tolyltriethoxysilane; vinyl silanes such as vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltrimethoxysilane, vinyltriphenoxysilane, vinyltri-t-butoxysilane, vinyltris(isobutoxy)silane, vinyltriisopropenoxysilane, and vinyltris(2-methoxyethoxy)silane; and combinations thereof.

Carboxylic acid surface modifying agents may comprise the reaction product of phthalic anhydride with an organic compound having a hydroxyl group. Suitable examples include, for example, phthalic acid mono-(2-phenylsulfanyl-ethyl)ester, phthalic acid mono-(2-phenoxy-ethyl)ester, or phthalic acid mono-[2-(2-methoxy-ethoxy)-ethyl]ester. In some examples, the organic compound having a hydroxyl group is a hydroxyl alkyl(meth)acrylate such as hydroxyethyl (meth)acrylate, hydroxypropyl(meth)acrylate, or hydroxylbutyl(meth)acrylate. Examples include, but are not limited to, succinic acid mono-(2-acryloyloxy-ethyl)ester, maleic acid mono-(2-acryloyloxy-ethyl)ester, glutaric acid mono-(2-acryloyloxy-ethyl)ester, phthalic acid mono-(2-acryloyloxy-ethyl)ester, and phthalic acid mono-(2-acryloyl-butyl)ester. Still others include mono-(meth)acryloxy polyethylene glycol succinate and the analogous materials made from maleic anhydride glutaric anhydride, and phthalic anhydride.

In another example, the surface modification agent is the reaction product of polycaprolactone and succinic anhydride such as described in PCT Publication No. WO2010/074862.

Various other surface treatments are known in the art, such as described in WO2007/019229; incorporated herein by reference.

The surface treatment may comprise a blend of two or more hydrophobic surface treatments. For example, the surface treatment may comprise at least one surface treatment having a relatively long substituted or unsubstituted hydrocarbon group. In some embodiments, the surface treatment comprises at least one hydrocarbon group having at least 6 or 8 carbon atoms, such as isooctyltrimethoxy silane, with a second surface treatment that is less hydrophobic, such as methyl trimethoxy silane. The relatively long substituted or unsubstituted hydrocarbon group typically has no greater than about 20 carbons atoms.

The surface treatment may also comprise a blend of a hydrophobic surface treatment and (e.g. a small concentration of) a hydrophilic surface treatment, provided that the inclusion of such does not detract from the properties contributed by the hydrophobic nanoparticles.

The nanoparticles are typically surface modified prior to mixing the nanoparticles with the particles. The amount of surface modifier is dependant upon several factors such as nanoparticle size, nanoparticle type, molecular weight of the surface modifier, and modifier type. In general, it is preferred that approximately a monolayer of modifier is attached to the surface of the nanoparticle. The attachment procedure or reaction conditions also depend on the surface modifier used. For silanes it is preferred to surface treat at elevated temperatures under acidic or basic conditions for about 1-24 hour. Surface treatment agents such as carboxylic acids do not require elevated temperatures or extended time.

The surface modification of the nanoparticles in the colloidal dispersion can be accomplished in a variety of ways. The process involves the mixture of an inorganic dispersion with surface modifying agents. Optionally, a co-solvent can be added at this point, such as for example, 1-methoxy-2-propanol, methanol, ethanol, isopropanol, ethylene glycol, N,N-dimethylacetamide, 1-methyl-2-pyrrolidinone, and mixtures thereof. The co-solvent can enhance the solubility of the surface modifying agents as well as the dispersibility of the surface modified nanoparticles. The mixture comprising the inorganic sol and surface modifying agents is subsequently reacted at room or an elevated temperature, with or without mixing.

A minor amount of nanoparticles is generally combined with a major amount of (e.g. fine abrasive) particles to form a mixture. The mixture can optionally be milled such that the milled particles have a reduced particle size as described in U.S. patent application Ser. No. 61/220,698 filed Jun. 26, 2009.

In many embodiments, the hydrophobic (e.g. surface modified) nanoparticles will be present in an amount no greater than 10 weight percent solids of the total particle mixture of particles and nanoparticles. In some embodiments, the hydrophobic nanoparticles are present in an amount no greater than about 5, 4, 3, 2 weight percent solids. The amount of hydrophobic nanoparticles is typically at least 0.01 wt-%, 0.05 wt-%, or 0.10 wt-% solids. In some embodiments, the amount of hydrophobic nanoparticles is at least 0.20 wt-% solids, 0.30 wt-% solids, 0.40 wt-% solids, or 0.50 wt-% solids. However, if the (e.g. fine abrasive) particles are a concentrated master batch, the concentration of hydrophobic nanoparticles may be substantially higher.

In some embodiments, the (e.g. abrasive) particles are combined with (i.e. dry) surface-modified nanoparticles.

In other embodiments, the (e.g. abrasive) particles are combined with a volatile inert liquid that is not a solvent (i.e. with respect to the larger particles), and a nanoparticle-containing colloidal dispersion. Typical liquids that may be employed include, for example, toluene, isopropanol, heptane, hexane, octane, and water. The amount of liquid is sufficiently small such that the liquid evaporates during mixing. The concentration of liquid in the mixture is less than 5 wt-%. In some embodiments, the amount of liquid is no greater 4, 3, 2, 1, or 0.5 wt-%. If a higher concentration of liquid is employed, the method then typically further comprises removing the liquid, for example by filtering and/or evaporation to recover a free-flowing dry powder.

The (e.g. abrasive) particles in combination with the nanoparticles are coated by an electrostatic deposition technique as known in the art, such as described for example in U.S. Pat. No. 2,287,837; U.S. Pat. No. 2,447,347; U.S. Pat. No. 6,037,019; and US 2001/0049911; incorporated herein by reference. Such methods generally comprise electrostatically depositing particles such that the particles are bonded to a substrate. Particularly in the case of abrasive articles, electrostatic deposition techniques can be used to provide abrasive articles having orientated abrasive particles. Orientated abrasive particles can be characterized as having a majority (e.g. at least 50, 60, 70, 80, 90% or greater) of abrasive particle embedded in the binder such that the apices of the particles are orthogonal to the substrate of the abrasive article. In contrast, in the case of non-orientated abrasive particles, as can be manufactured by other (e.g. slurry) processes, the abrasive particles are randomly embedded in the binder. Although the apices of a portion of the particles may be orthogonal to the substrate, a major amount of the particles have apices pointing in other directions.

In one method of electrostatic coating, as described in US 2001/0049911, an (e.g. abrasive grain) particle can be deposited on an uncured or partially cured binder material. One common deposition technique involves electrostatic deposition in which the grain is projected upwards under the influence of an electrostatic field into contact with the binder. These processes may be described as UP (for upward projection) processes. The (e.g. abrasive grain) particle is fed from a hopper to a moving belt which is passed through a deposition location, defined by a charged plate located below the moving belt and directly opposite and parallel to a grounded plate located above the moving belt. The substrate on to which the grain is to be deposited follows a path parallel to and above the moving belt as they both pass through the deposition location. The electrostatic field between the charged plate and the grounded plate causes the grain to be projected upwards towards the down-facing surface of the substrate where it adheres to an uncured or partially cured binder coated thereon.

One preferred method for making (e.g. abrasive) particle coated substrates is described in U.S. Pat. No. 6,037,019; incorporated herein by reference. Such process includes the steps of: a) providing a (e.g. bipolar) oscillating magnetic field, b) continuously introducing into the magnetic field coating material, a substrate, and a means of affixing the coating material to the substrate by forming a fluidized bed of at least the coating material and providing sufficient force to cause the coating material to adhere to the surface of the substrate, and c) continuously collecting the coated substrate.

The abrasive grain can be fabricated into an abrasive article using an electrostatic deposition method as just described.

The abrasive articles typically comprise a backing (substrate) and abrasive grains, as described herein, adhered thereto by a binder. The backing may be cloth, polymeric film, fiber, nonwoven web, paper, or combinations thereof or treated versions thereof. Any of a variety of inorganic or organic binders may be utilized. Various backings and binders are known in the art, such as described in U.S. Pat. No. 6,758,734.

The coated abrasive article backing may have additional coatings (e.g., saturant, backsize layer, presize layer, tie layer), which may, for example, be present as continuous or discontinuous layers as dictated by the function or purpose of the material as known to one skilled in the art. For example, it may be desirable to provide a saturation coat to smooth the inherent textured surface of the paper backing material, particularly if utilizing fine grades of abrasive (e.g., ANSI grade 400 or finer). A backsize layer, which is applied to the back side of the backing, that is, the side opposite to which the abrasive particles are applied, adds body to the backing material and protects the backing material from wear. A presize layer is similar to a saturation coat except that it is applied to a previously treated backing.

The coated abrasive article may have additional coatings applied over the electrostatically-deposited abrasive grain layer. A size layer is typically applied to further secure the abrasive grains to the backing. A supersize layer, that is, a coating applied on at least a portion of the size layer, can be added to provide, for example, a grinding aid, and/or as an anti-loading coating.

Further, with regard to the optional supersize layer, it may serve to prevent or reduce the accumulation of swarf (the material abraded from a workpiece) between abrasive particles which can dramatically reduce the cutting ability of the coated abrasive article. Useful supersize layers desirably include a grinding aid (e.g., potassium tetrafluoroborate), metal salts of fatty acids (e.g., zinc stearate or calcium stearate), salts of phosphate esters (e.g., potassium behenyl phosphate), phosphate esters, urea-formaldehyde resins, mineral oils, crosslinked silanes, crosslinked silicones, and/or fluorochemicals. Useful supersize materials are further described, for example, in U.S. Pat. No. 5,556,437 (Lee et al.), the disclosure of which is incorporated herein by reference.

Nonwoven abrasive products incorporating abrasive grains comprise an open porous lofty polymer filament structure (substrate) having the abrasive grains of the invention distributed throughout the fiber structure and bonded therein by an organic binder. Typical fibrous filament structures usable with such constructions comprise polyamides, polyesters, or polypropylene.

A wide variety of binders may be used in abrasive products according to the present invention, including conventional ones. Useful binders include phenolic, urea-formaldehyde, melamine-formaldehyde, polyester resins, glue, aminoplast resins, epoxy resins, acrylate resins, urethane resins and combinations thereof. The binder may also include additives such as grinding aids, fillers, coupling agents, dyes, pigments, wetting agents, and dispersion aids. Examples of such grinding aids are described in U.S. Pat. No. 5,352,254. Examples of fillers include calcium carbonate, silica and calcium metasilicate.

In one embodiment, the fine abrasive grain described herein is the sole abrasive grain of an abrasive article. Alternatively, however, the fine abrasive grain may be used in combination with other (e.g. larger) abrasive grains including for example agglomerates, abrasive composite particles, and mixtures thereof.

Figure 2:
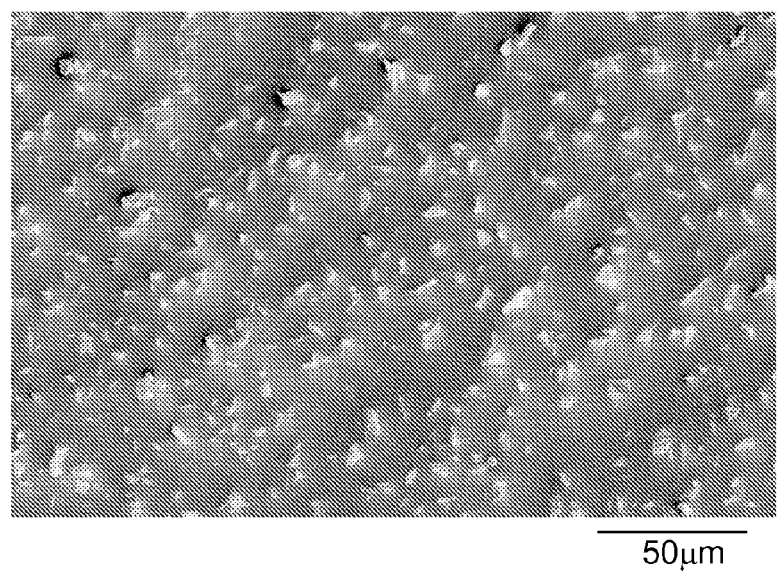
FIG. 2 depicts an illustrative scanning electron photomicrograph of the surface of an abrasive article comprising silicon carbide abrasive grain particles and hydrophobic nanoparticles.
Figure 3:
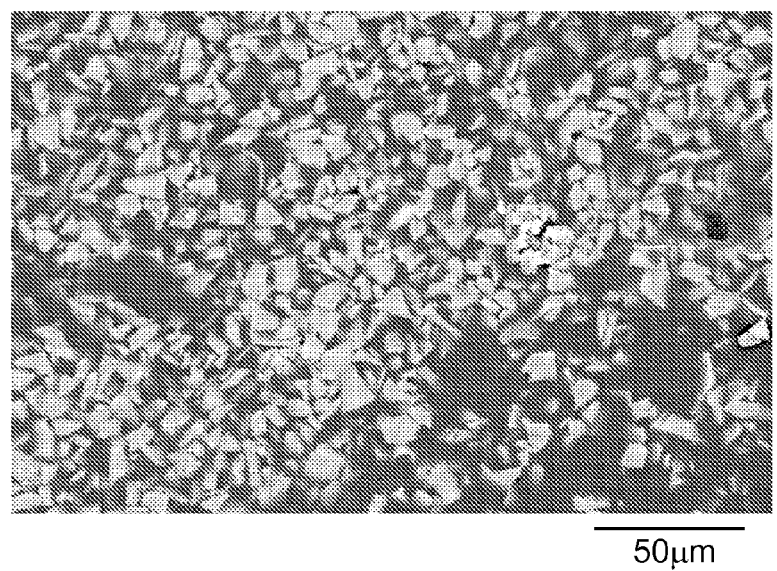
FIG. 3 depicts an illustrative scanning electron photomicrograph of the surface of an abrasive article comprising silicon carbide abrasive grain particles without hydrophobic nanoparticles.

The inclusion of the nanoparticles can aid in the deposition of the (e.g. abrasive) particles by electrostatic deposition techniques. In some embodiments, it was not possible to charge the abrasive particles when the nanoparticles were excluded. In other embodiments, the inclusion of the nanoparticles widened the processing parameters such that the temperature and humidity need not be precisely controlled. In yet other embodiments, as illustrated in FIGS. 1-2, relative to FIG. 3, the inclusion of the nanoparticles provided abrasive articles that exhibited improved uniformity. The uniformity of a (e.g. abrasive) particle coated surface can be determined by various methods, as known in the art (see, for example, ASTM D7127-05). In one aspect, FIGS. 1 and 2 can be distinguished from FIG. 3 with respect to the total number of agglomerated abrasive particles. FIGS. 1 and 2 depict the vast majority of the abrasive particles being present as primary unagglomerated abrasive particle, i.e. at least 80%, 85%, 90%, or 95% of the particles are surrounded by binder rather than being in contact with an adjacent abrasive particle. In contrast, in FIG. 3 at least 80%, 85%, 90%, or 95% of the particles are present as agglomerated abrasive particles, wherein the particles are in contact with at least one and typically two or more adjacent abrasive particles. The abrasive article of FIG. 3 also includes (two 25 $\mu m^2$) portions lacking any abrasive particles. Although FIGS. 1-3 depict only a small representative area of the surface of the abrasive article, one of ordinary skill in the art appreciates that an average of about 10 measurements evenly distributed over the entire surface area of the abrasive article (e.g. 3 inch circular disk) would be averaged to numerically calculate the uniformity of the abrasive article. One of ordinary skill in the art can also determine the uniformity with respect to a minimum, maximum, and average distance between particles over a surface area or with respect to a deviation from such distances.

The resulting abrasive article is particularly useful in removing surface defects such as macroscratches and small protrusions, also commonly referred to as "nibs" from painted (e.g. automobile, aircraft, furniture, etc.) surfaces. Such small protrusions generally range in size from about 20-40 microns, such as would result from dust particles becoming entrapped in the freshly applied paint, up to about 2-3 mm, such as would result from fibers becoming entrapped in the paint. In some embodiments, the abrasive article can be used to remove 1 or 2 and preferably 3, 4, 5, or 6 nibs prior to the abrasive article failing. In some embodiments, the average surface roughness ($R_z$) after sanding with an embodied abrasive article, as determined according to the test method further described in the examples, is no greater, 1.0, 0.9, or 0.8. In favored embodiments, the $R_z$ is no greater than 0.7, 0.6 or 0.5. The maximum surface roughness ($R_{max}$), after sanding with an embodied abrasive article, is preferably no greater than 1.0, 0.9, or 0.8. In favored embodiments, the $R_{max}$ is no greater than 0.7, or 0.6.

Although, the fine abrasive grain described herein is preferably fabricated into an abrasive article by methods that employ electrostatic deposition, such abrasive grain may also be fabricated into an abrasive article using other methods (i.e. do not employ electrostatic deposition) such as slurry methods. Other methods of making a coated abrasive are known. (See for example is described in U.S. Pat. No. 4,734,104 (Broberg) and U.S. Pat. No. 4,737,163 (Larkey). In such other methods, the inclusion of the nanoparticle may aid in dispersing the fine (e.g. abrasive) particles.

The fine abrasive grain described herein may also be utilized in bonded abrasive products generally comprise shaped masses of abrasive grain as described herein held together by organic, metallic, or vitrified binder. A particularly common shaped mass for abrasive products is a grinding wheel that comprises abrasive grains molded in a wheel and mounted on hub. Method of making bonded abrasive articles are also known. (See for example U.S. Pat. No. 4,997,461 (Markhoff-Matheny et al.) and U.S. Pat. No. 3,867,795 (Howard).

Although fine abrasive particles are a favored embodiment, the inclusion of the hydrophobic surface modified nanoparticles is believed to provide the same benefit to other (e.g. hydrophilic) particles. The particles may include organic particles, inorganic particles, and combinations thereof.

In one embodiment, the particles for electrostatic deposition are suitable for use as a powder (e.g. paint) coating. Powder coatings typically comprise a thermosetting polymer. Classes of resins suitable for powder coatings include epoxy resin, polyester resin, polyurethane resins, epoxy/polyester hybrid resin, and acrylic resins. Many of such resins are the same classes of resins that are utilized as a binder in an abrasive article. Powder coatings also comprise fillers, and colorants such as pigments at a concentration up to 50 wt-%. A conventional powder coating technique typically includes electrostatic spraying processes, followed by thermally treating the powder to melt the powder coating and initiate curing. Such powder coating techniques are well known to one of skill in the art.

Objects and advantages of this invention are further illustrated by the following examples, but the particular materials and amounts thereof recited in these examples, as well as other conditions and details, should not be construed to unduly limit this invention.

Preparation of Surface Modified Nanoparticles (SMNs)

100 grams of 16.06% solids nano-sized colloidal silica commercially available under the product designation NALCO 2326 (Nalco Chemical Co., Naperville, Ill.) was measured into a 3-neck round-bottom flask. The flask was equipped with a reflux condenser and a mechanical stirrer. 112.5 g of a mixture, 80% by weight of ethanol (EMD, Gibbstown, N.J.) and 20% by weight of methanol (VWR, West Chester, Pa.), was prepared in a 250 mL glass beaker. In a 150 mL beaker, the following components were measured in the following order: half of the 80:20 ethanol:methanol mixture, 7.54 g of isooctyltrimethoxy silane (Gelest, Morrisville, Pa.) and 0.81 g of methyltrimethoxy silane (Sigma-Aldrich Corp., St. Louis, Mo.) The solution was mixed thoroughly and then added to the 3-neck round-bottom flask. The last half of the 80:20 ethanol:methanol was used to rinse any remaining silane from the 150 mL beaker into the reaction. The reaction was allowed to stir for 4 hours in an oil bath set at 80° C. The surface modified nanoparticles were transferred to a crystallizing dish and dried in an oven set at 150° C. for approximately 1.5 hours. The dried, white product was manually ground up using a mortar and pestle and transferred to a glass jar.

Aluminum Oxide Abrasive Grain Preparation 300 g of the aluminium oxide granules having an average particle size of between about 7.9-8.9 microns and commercially available as P2500 (Treibacher Schleifmittel North America, Inc, Niagara Falls, N.Y.) was mixed with 100 g of the SMNs discussed above. The mixing was performed in a FlackTek Speedmixer™ DAC 400FVZ (Hauschild, High Wycombe, UK) at 1000 rpm. Thereafter, further 4.7 Kg of the P2500 granules was added to the mixer in 300 g portions over the course of 6 minutes so as to produce a 2% loading of SMNs in the overall mixture. After mixing, the mixture was put in a 110° C. oven for at least 18 hours.

Silicon Carbide Abrasive Grain Preparation

A second mineral sample was made generally as set forth as Mineral Sample Preparation A, except that silicon carbide granules with an average particle size 4.0 microns, commercially available as P3000 (Fujimi Corp., Tualatin, Oreg.) was used instead of the P2500 aluminum oxide granules. Each of the abrasive grains were used to make to different abrasive articles, as described as follows:

Abrasive Article Preparation A

An abrasive article was prepared by coating paper, having a basis weight of 115 gram/$m^2$, with a phenolic resin binder at coating weight of 3 g/$m^2$ using a conventional t-roll coater. The aluminum oxide abrasive grain was given an electrostatic charge by being exposed to an electric field having a voltage of 42 kHz and alternating at a frequency of 10 Hz. A temperature of 34 to 36° C. and a relative humidity of 23 to 26% was maintained during this charging.

The charged granules where then lifted by electrostatic forces onto the adhesive coated substrate so as to form an abrasive article. The abrasive article was then directed through an oven at a temperature of 107° C. to cure the adhesive. A sizing layer of phenolic resin was then coated over the grains and the adhesive. The sizing was then cured at 118° C.

Abrasive Article Preparation A1

Some of the abrasive articles made with Abrasive Article Preparation A were further treated by the topical application of calcium stearate (eCHEM, Leeds, UK). The calcium stearate was applied at the level of 2 g/m². It is known in the art of abrasive article preparation to apply calcium stearate to prevent loading of the abrasive articles during use, especially for grits of size P80 and finer.

Abrasive Article Preparation B

A second abrasive article was made generally as set forth as in Abrasive Article Preparation A, except that the silicon carbide abrasive grains were used instead of the aluminum oxide abrasive grains.

Abrasive Article Preparation B1

Some of the abrasive articles made with Abrasive Article Preparation B were further treated by the topical application of calcium stearate (eCHEM, Leeds, UK). The calcium stearate was applied at the level of 2 g/m².

Comparative Abrasive Article Preparation C1

When a comparative abrasive article was prepared in the same manner as B1 except that the surface modified nanoparticles were omitted it was not possible to impart a charge to the abrasive articles.

Comparative Abrasive Article

A comparative abrasive article was prepared in a similar manner as B1 except that the surface modified nanoparticles were omitted and the processing conditions, particularly the temperature and relative humidity were more precisely controlled.

Micrographic Analysis of the Abrasive Articles

Samples of Abrasive Articles A, B, and C1 were cut and prepared for micrographic analysis. SEM micrographs of these articles are illustrated as FIGS. 1, 2, and 3 respectively. The micrographs of FIG. 1 (i.e. Abrasive Article A) and FIG. 2 (i.e. Abrasive Article B) depict a uniform distribution of the abrasive particles on the surface. However, the micrograph of FIG. 3 (i.e., Abrasive Article C) depicts a comparatively less uniform distribution of abrasive particles.

Abrasion Trials

Abrasive articles A, A1, B, and B1 were subjected to tests of their abrasive capabilities. The trials were performed by placing each of the Abrasive articles in turn onto a random orbital sander commercially available as Model SI-2107 (Shinano, Tokyo, JP). A medium backup pad commercially available as Part #02345 (3M Company, St. Paul, Minn.), was employed between the sander and the abrasive article. Using this set-up, dry sanding was performed on standard automotive clear coat panels commercially available as either 2K-ProtectClear (DuPont, Wuppertal, Germany) or 2K-Pro-Gloss (BASF, Muenster, Germany).

The quality of the sanding was measured by the ability to remove nibs (i.e. a small sharp protrusion such as caused by an entrapped dirt particle) from the surface of the paint, and more particularly how many nibs could be removed before failure of the abrasive article occurred, was measured. The depth of the scratches in the panels after sanding was determined using a surface roughness tester equipped with a diamond needle, commercially available as T500 (Hommel-Werke GmbH, Schwenningen, Germany). The assessments of this surface roughness tester are returned as values for $R_z$, the definition of which is discussed in "Profile method—Terms, definitions and surface texture parameters" (ISO 4287:1997). Each $R_z$ value was an average of three measurements. The largest value of these three measurements is reported as $R_{max}$. This was done three times for each abrasive article and averaged. Those values are reported in Table 1 below.

TABLE 1

| Abrasive article | Number of nibs removed before failure | $R_z$ | $R_{max}$ |
|---|---|---|---|
| A | 1 | 1.10 | 1.40 |
| A1 | 6 | 1.95 | 2.69 |
| B | 3 | 0.46 | 0.55 |
| B1 | 6 | 0.46 | 0.59 |
| Comparative Abrasive Article | 3 | 0.42 | 0.50 |

Although B1 and the Comparative Abrasive Article both utilized the same silicon carbide abrasive grain and both such abrasive articles included the same topical application of calcium stearate, C1, lacking the hydrophobic nanoparticles could only remove half as many nibs as B1.

What is claimed is:

1. A method of making an article comprising:
    providing a substrate;
    electrostatically depositing particles such that the particles are bonded to the substrate wherein the particles comprise
    i) a plurality of particles having a median primary particle size of less than 75 microns, and
    ii) discrete hydrophobic unaggregated nanoparticles, wherein the nanoparticles have an average primary particle size of less than 100 nanometers.

2. The method of claim 1 wherein the nanoparticles comprise a metal oxide material and the nanoparticles comprise a hydrophobic surface treatment.

3. The method of claim 1 wherein the particles comprise abrasive particles.

4. The method of claim 3 wherein the abrasive particles are orientated.

5. The method of claim 3 wherein the abrasive particles comprise fused aluminum oxide, heat-treated aluminum oxide, ceramic aluminum oxide, silicon carbide, alumina zirconia, garnet, diamond, cubic boron nitride, sol-gel derived abrasive particles, or a mixture thereof.

6. The method of claim 1 wherein the nanoparticles are present in an amount up to 2 wt-%.

7. The method of claim 1 wherein the particles have a median particle size of less than 50 microns.

8. The method of claim 1 wherein the particles have a median particle size of less than 25 microns.

9. The method of claim 1 wherein the particles have a median primary particle size 100 to 10,000 times larger than the average particle size of the nanoparticles.

10. The method of claim 2 wherein the nanoparticles comprise silica, zirconia, or a mixture thereof.

11. The method of claim 2 wherein the hydrophobic surface treatment is an organosilane compound.

12. The method of claim 1 wherein the hydrophobic surface treatment comprises a substituted or unsubstituted hydrocarbon group having at least 6 carbon atoms.

13. An abrasive grain comprising:
i) a plurality of abrasive particles having a median primary particle size of less than 75 microns, and
ii) discrete hydrophobic unaggregated nanoparticles, wherein the nanoparticles have an average primary particle size of less than 100 nanometers.

14. The abrasive grain of claim 13 wherein the nanoparticles comprise a metal oxide material and the nanoparticles comprise a hydrophobic surface treatment.

15. The abrasive grain of claim 13 wherein the abrasive particles comprise fused aluminum oxide, heat-treated aluminum oxide, ceramic aluminum oxide, silicon carbide, alumina zirconia, garnet, diamond, cubic boron nitride, sol-gel derived abrasive particles, or a mixture thereof.

16. The abrasive grain of claim 13 wherein the particles have a median particle size of less than 50 microns.

17. The abrasive grain of claim 13 wherein the particles have a median particle size of less than 25 microns.

18. The abrasive grain of claim 13 wherein the nanoparticles have a particle size of less than 100 nanometers.

19. An abrasive article comprising:
a substrate; and
a plurality of abrasive grain particles according to claim 13 bonded to the substrate.

20. A method of repair of a painted surface comprising:
providing a painted surface having a surface defect;
removing the surface defect by abrading with the abrasive article of claim 19.

21. The abrasive grain of claim 13 wherein the hydrophobic surface treatment comprises a substituted or unsubstituted hydrocarbon group having at least 6 carbon atoms.

22. The abrasive grain of claim 13 wherein the abrasive grain is a free-flowing dry powder of the abrasive particles and discrete hydrophobic nanoparticles.

* * * * *

UNITED STATES PATENT AND TRADEMARK OFFICE
CERTIFICATE OF CORRECTION

| | | |
|---|---|---|
| PATENT NO. | : 8,894,466 B2 | |
| APPLICATION NO. | : 13/513207 | |
| DATED | : November 25, 2014 | |
| INVENTOR(S) | : Katrin Jungbauer et al. | |

It is certified that error appears in the above-identified patent and that said Letters Patent is hereby corrected as shown below:

In the Specification,

Column 10
Line 66, Delete "t-roll" and insert -- 2-roll --, therefor.

Signed and Sealed this
Ninth Day of June, 2015

Michelle K. Lee
*Director of the United States Patent and Trademark Office*